United States Patent Office 3,647,861
Patented Mar. 7, 1972

3,647,861
SUBSTITUTED O-CARBAMYLHYDROXAMATES
James B. Buchanan, Wilmington, Del., assignor to E. I. du Pont de Nemours and Company, Wilmington, Del.
No Drawing. Division of application Ser. No. 670,494, Aug. 31, 1967, now Patent No. 3,576,834, which is a continuation-in-part of application Ser. No. 602,134, Dec. 16, 1966, which in turn is a continuation-in-part of application Ser. No. 361,277, Apr. 20, 1964. This application Aug. 25, 1970, Ser. No. 66,876
Int. Cl. C07c 149/20
U.S. Cl. 260—481 R
4 Claims

ABSTRACT OF THE DISCLOSURE

Substituted O-carbamylhydroxamates such as methyl O-(methylcarbamyl)thiolacetohydroxamate useful as pesticides.

CROSS REFERENCE TO RELATED APPLICATIONS

This application is a division of my copending application Ser. No. 670,494, filed Aug. 31, 1967, now Pat. No. 3,576,834, which in turn was a continuation-in-part of my then copending application Ser. No. 602,134, filed Dec. 16, 1966, now abandoned, which in turn was a continuation-in-part of my then copending application Ser. No. 361,277, filed Apr. 20, 1964, now abandoned.

BACKGROUND OF THE INVENTION

This invention relates to carbamylhydroxamates and more particularly is directed to substituted O-carbamylhydroxamates and their use in controlling insects and other arthropod pests.

Such pests as insects, ticks and mites are a constant irritation and threat to man. They injure and destroy plants, consume stored food supplies, damage useful organic materials such as wood and wool, directly set upon man and animals and invade their dwellings contributing to the spread of some of the most serious and harmful diseases. A major factor in the control of such pest organisms is the chemical pesticide. There is a continuing need for new chemical pesticides to replace those to which pest organisms have become resistant. There is also always a need for chemicals possessing greater activity or which are active against a broader variety of pests. And, of course, there is always a need for lower cost pesticides.

Various oximes and aldoximes are known in the art to possess biological activity. Such compounds as those of U.S. Pat. No. 3,063,823 for example, are disclosed to be herbicides, the compounds of U.S. Pat. No. 3,193,561 are disclosed to be effective insecticides, and the compounds of U.S. Pat. No. 3,217,037 are disclosed to be insecticides, miticides and nematocides. However, I have discovered a new class of carbamylhydroxamates which possess an exceptional combination of pesticidal properties.

SUMMARY OF THE INVENTION

This invention concerns compounds of the formula (1)  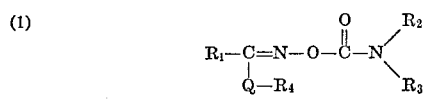

wherein:

$R_1$ is alkyl of 1 through 5 carbon atoms; haloalkyl of 1 through 5 carbon atoms, with the limitation that there may be present up to 11 fluorine atoms and up to 5 chlorine and bromine atoms and their mixtures; alkoxyalkyl of 2 through 5 carbon atoms; carboalkoxyalkyl of 3 through 6 carbon atoms; carboalkoxy of 2 through 6 carbon atoms; alkylthioalkyl of 2 through 5 carbon atoms; cycloalkyl of 3 through 5 carbon atoms; naphthyl; and

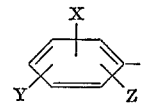

where:

X is hydrogen, fluorine, chlorine, bromine, nitro, cyano, trifluoromethyl, and dimethylamino;
Y is hydrogen, chlorine, alkyl of 1 through 4 carbon atoms, and alkoxy of 1 through 4 carbon atoms; and
Z is hydrogen or chlorine, with the limitation that Z is chlorine only when X and Y are chlorine;
$R_2$ is hydrogen or methyl;
$R_3$ is hydrogen or methyl;
$R_4$ is alkyl of 1 through 6 carbon atoms; benzyl; and chlorobenzyl; and
Q is oxygen or sulfur;

and the use of these compounds in controlling pests such as insects, ticks and mites.

The above compounds in addition to being effective pest control agents demonstrate a good level of safety to seeds, fruit, foliage and other plant parts, are not readily absorbed through the skin by humans and domestic animals, and exhibit good stability which facilitates handling and storage.

DESCRIPTION OF THE PREFERRED EMBODIMENTS

Preparation

O-carbamylhydroxyamates of Formula 1 are prepared by reacting a hydroxamate ester with sodium hydride in a suitable solvent such as tetrahydrofuran, adding the resulting sodium salt to a solution of phosgene, and then reacting the chloroformate intermediate with two equivalents of ammonia. The reaction is illustrated by the following equations:

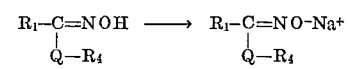

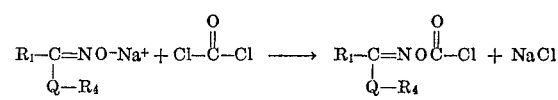

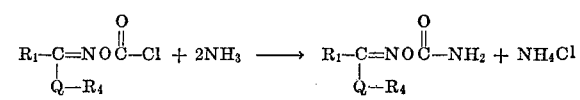

wherein:

$R_1$, $R_4$ and Q have the same meaning as above.

O-carbamylhydroxamates of Formula 1 can also be prepared by reacting a hydroxamate ester with an alkali metal cyanate and trifluoroacetic acid in an inert solvent such as benzene. This reaction is illustrated by the following equation:

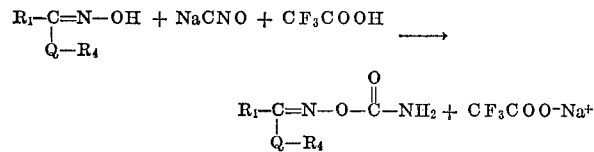

wherein:

$R_1$, $R_4$ and Q are the same as above.

The hydroxamate ester intermediates required in the above synthesis can be prepared through reaction of an imino ether hydrochloride with hydroxylamine using conditions described in the literature. See, for example, Ber., 29, 1149 (1896); Ber., 59, 2395 (1926); Ber., 69, 2352 (1936). A significantly improved method for carrying out this reaction is disclosed in copending application Ser. No. 571,963.

Thiolhydroxamate intermediates can also be prepared by chlorination of an aldoxime in an inert solvent to form the corresponding hydroxamoyl chloride (see Ber., 27, 2197 (1894)), followed by reaction of the latter with the alkali metal salt of an alkyl mercaptan.

The O-(methylcarbamyl)hydroxamates of this invention are prepared by treating a hydroxamate ester, prepared as described above, with methyl isocyanate in the presence of an aprotic solvent such as benzene, toluene, methylene chloride, 1,2-dichloroethane, ethyl ether, tetrahydrofuran or their mixtures. Frequently it is advantageous to carry out the reaction in the presence of a small amount of 1,4-diaza-bicyclo[2,2,2]-octane, triethylamine, or other basic material as a catalyst. This method is illustrated by the following equation.

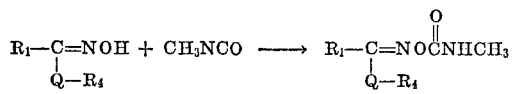

wherein:

$R_1$, $R_4$ and Q have the same meaning as above.

The O-(dimethylcarbamyl)hydroxamates of this invention can be prepared by reacting a hydroxamate ester with sodium hydride in a solvent such as tetrahydrofuran, and then treating the resulting sodium salt with dimethylcarbamyl chloride. This method is illustrated by the following equations:

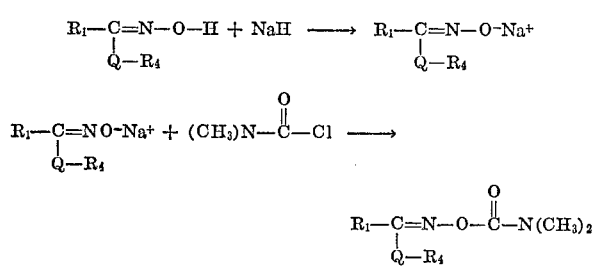

wherein:

$R_1$, $R_4$ and Q have the same meaning as above.

Pests controlled

Insects, ticks and mites that are killed, repelled, prevented from reproducing, or otherwise prevented from causing damage by the compositions of this invention are represented by, but not limited to, the following:

Aphids:
  Bean aphid—*Aphis fabae*
  Cabbage aphid—*Brevicoryne brassicae*
  Corn leaf aphid—*Aphis maidis*
  Corn root aphid—*Anuraphis maidi-radicis*
  Cotton aphid—*Aphis gossypii*
  Green peach aphid—*Myzus persicae*
  Potato aphid—*Macrosiphum solanifolii*
  Rose aphid—*Macrosiphum rosae*
  Wooly apple aphid—*Eriosoma lanigerum*

Armyworms:
  Fall armyworm—*Laphygma frugiperda*
  Southern armyworm—*Prodenia eridania*

Beetles:
  Asiatic garden beetle—*Autoserica castanea*
  Bean leaf beetle—*Cerotoma trifurcata*
  Cigarette beetle—*Lasioderma serricorne*
  Colorado potato beetle—*Leptinotarsa decemlineata*
  Japanese beetle—*Popillia japonica*
  Mexican bean beetle—*Epilachna varivestis*
  Squash beetle—*Epilachna borealis*
  Sugarcane beetle—*Euetheola rugiceps*
  White-fringed beetle—*Graphognathus leucoloma*

Boll weevil—*Anthonomus grandis*
Bollworm—*Heliothis zea*

Borers:
  European cornborer—*Pyrausta nubilalis*
  Peach tree borer—*Sanninoidea exitosa*
  Squash vine borer—*Melittia cucurbitae*
  Sugarcane borer—*Diatraea saccharalis*
  Oriental rice borer—*Chilo simplex*

Butterflies:
  Clouded sulfur—*Colias philodice*
  Imported cabbageworm—*Pieris rapae*

Caterpillars:
  Alfalfa caterpillar—*Colias eurytheme*
  Easter tent caterpillar—*Malacosoma americanum*

Corn earworm—*Heliothis zea* (see bollworm)
Cotton stainer—*Dysdercus suturellus*

Flea beetles:
  Corn flea beetle—*Chaetocnema pulicaria*
  Potato flea beetle—*Epitrix cucumeris*
  Tobacco flea beetle—*Epitrix hertipennis*

Fleahopper, cotton—*Psallus seriatus*

Flies:
  Black fly (citrus)—*Aleurocanthus woglumi*
  Hessian fly—*Phytophaga destructor*
  Horn fly—*Siphona irritans*
  House fly—*Musca domestica*
  Stable fly—*Stomoxys calcitrans*

Fruit flies:
  Mediterranian fruit fly—*Ceratitis capitata*
  Mexican fruit fly—*Anastrepha ludens*
  Oriental fruit fly—*Dacus dorsalis*

German cockroach—*Blattella germanica*
Leaf rollers:
  Fruit tree leaf roller—*Archips argyrospila*
  Red-banded leaf roller—*Argyrotaenia velutinana*
Leafhoppers:
  Beet leafhopper—*Circulifer tenellus*
  Potato leafhopper—*Empoasca fabae*
  Sugarcane leafhopper—*Perkinsiella saccharicida*
Leafworm, cotton—*Alabama argillacea*

Loopers:
  Alfalfa looper—*Autographa californica*
  Cabbage looper—*Trichoplusia ni*
Maggot, seed-corn—*Hylemya platura*
Mealybugs:
  Citrus mealybug—*Pseudococcus citri*
  Pineapple mealybug—*Pseudococcus brevipes*
Mites:
  Citrus red mite—*Paratetranychus citri*
  Clover mite—*Bryobia praetiosa*
  European red mite—*Panonychus ulmi*
  Pacific mite—*Tetranychus pacificus*
  Two-spotted spider mite—*Tetranychus urticae*
Mosquitos:
  Common malaria mosquito—*Anopheles quadrimaculatus*
  Salt-marsh mosquito—*Aedes sollicitans*
  Southern house mosquito—*Culex pipiens quinquefasciatus*
Moths:
  Clothes moth—*Tineola biselliella*
  Codling moth—*Carpocapsa pomonella*
  Europeon Pine shoot moth—*Rhyacionia buoliana*
  Grape berry moth—*Polychrosis viteana*
  Gypsy moth—*Porthetria dispar*
  Oriental fruit moth—*Grapholitha molesta*
  Tussock moth, white-marked—*Hemerocampa leucostigma*
Pink bollworm—*Pectinophora gossypiella*
Plum curculio—*Conotrachelus nenuphar*
Rootworms:
  Corn rootworm—*Diabrotica longicornis*
  Southern corn rootworm—*Diabrotica undecimpunctata howardi*
Thrips:
  Onion thrips—*Thrips tabaci*
  Tobacco thrips—*Frankliniella fusca*
Ticks:
  American dog tick—*Dermacentor variabilis*
  Fowl tick—*Argas persicus*
Tobacco budworm—*Heliothis virescens*
Tobacco hornworm—*Protoparce sexta*
Weevils:
  Alfalfa weevil—*Hypera postica*
  Granary weevil—*Sitophilus granarius*
  Rice weevil—*Sitophilus oryzae*
  Sweetpotato weevil—*Cylas formicarius elegantulus*

Preferred compounds

Compounds of Formula 1 which are preferred because of their high order of pesticidal activity are those of the formula (2) 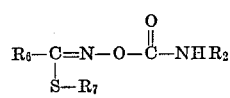

wherein:

$R_2$ is the same as in Formula 1;
$R_6$ is alkyl of 1 through 3 carbon atoms; and
$R_7$ is alkyl of 1 through 3 carbon atoms.

Particularly preferred compounds of Formula 1 because of their effectiveness against specific insects are:

Methyl O - (methylcarbamyl)thiolacetohydroxamate — highly effective against housefly, aphids, mites, southern armyworm, and boll weevil; and
Methyl O - carbamylthiolacetohydroxamate—highly effective against housefly, aphids and boll weevil.

Other particularly preferred compounds are:
Methyl O-(methylcarbamyl)p-nitrothiolbenzohydroxamate
Methyl O-(methylcarbamyl)p-chlorothiolbenzohydroxamate
Methyl O-(methylcarbamyl)thiolisobutyrohydroxamate
Methyl O-(methylcarbamyl)thiolpropionohydroxamate
Ethyl O-(methylcarbamyl)thiolacetohydroxamate
Ethyl O-carbamylthiolacetohydroxamate
Methyl O-carbamylthiolpropionohydroxamate
Ethyl O-carbamylthiolpropionohydroxamate
Ethyl O-(methylcarbamyl)thiolpropionohydroxamate Formulations Compositions of this invention suitable for practical use as pesticides will include one or more compounds of Formula 1 above either individually, as a complex, in admixture with each other, or in admixture with other pesticides or materials such as resins as disclosed in copending application Ser. No. 469,835, filed July 6, 1965, and can include surface-active agents, solid or liquid diluents and other materials as desired to produce wettable powders, suspensions, emulsifiable concentrates, dusts, solutions, granules, pellets or high-strength compositions.

The surface-active agents or surfactants, as they are sometimes called, useful in the formulations of this invention act as wetting, dispersing and emulsifying agents which assist dispersion of the active material in a spray. Additionally, the surfactants act as spreaders which aid in obtaining even coverage of the surfaces to be protected from insects and other pests. The surfactants can include such anionic, non-ionic and cationic agents as have been used heretofore in pesticidal compositions of similar type. A detailed list of such agents may be found in Detergents and Emulsifiers Annual (John W. McCutcheon, Inc.).

Anionic and non-ionic surfactants are preferred. Among the anionic surfactants, preferred ones are alkali and alkaline earth salts of alkylarylsulfonic acids, such as dodecylbenzenesulfonates and alkylnaphthalenesulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isothionate. Among the non-ionic surfactants, preferred ones include octylphenyl polyethylene glycol ethers, dodecylphenyl polyethylene glycol ethers, polyoxyethylene derivatives of sorbitan fatty esters and long-chain alcohols and mercaptans, as well as polyoxyethylene esters of fatty acids.

Preferred dispersants are alkali and alkaline earth salts of lignosulfonic acids, salts of polymerized alkylarylsulfonates which are sold under the "Daxad" and "Darvan" trademarks, as well as methylcellulose, polyvinyl alcohol and the like.

Surfactants can be used in compositions of this invention in amounts of up to 15% by weight based on the total weight of the resulting insecticidal composition.

The compositions can contain, with or without a surfactant, a finely divided solid diluent such as natural silicates, e.g., talc, sepiolite, pyrophyllite; clays, e.g., montmorillonite, kaolinite, attapulgite; diatomaceous earth, syntheic magnesium silicate, synthetic silicas, calcium silicate, calcium sulfate, calcium carbonate, calcium phosphate and flours derived from natural sources such as walnut shell, redwood, cottonseed and the like. The finely divided solids can be used in the compositions of this invention at a concentration of 1 to 98% by weight based on the total weight of the resulting pesticidal composition. Preferred finely divided solid formulations are high-strength compositions and powders containing 2 to 25% of synthetic silica and 75 to 98% active ingredients; and wettable powders containing 5 to 75% active ingredients, 1 to 5% surfactants, remainder finely divided solid diluents.

Organic liquids which are suitable for the preparation of solutions, suspensions and emulsifiable concentrates of the compounds of this invention include alcohols, glycols, cellosolves, carbitols, ketones, esters, sulfamides, amides, paraffinic hydrocarbons, aromatic hydrocarbons, and halogenated hydrocarbons. Solvent combinations in which water miscible solvents are combined with water, are particularly useful. Ordinarily, solvent choice is dictated by the solubility of the active compound to be used and whether a suspension or solution is desired. With both polar and nonpolar organic solvents, but particularly the latter, inclusion of 0.2 to 2.0 parts, per part of carbamate insecticide, of a phenolic compound containing at least one phenolic hydroxy group per molecule, functions to increase the solubility of some of the compounds of this invention such as methyl-O-(methylcarbamyl)thiolacetohydroxamate, ethyl O-(methylcarbamyl)thiolacetohydroxamate, and methyl O-(dimethylcarbamayl)thiolacetohydroxamate. Such inclusion also improves the compatibility of these compounds with other insecticides such as EPN, methoxychlor or DDT, which are soluble in non-polar solvents. Representative of such phenolic compounds are the cresols, o-t-butyl phenol, α-naphthol, resorcinol and bis-phenol A.

Preferred solutions are those containing 20 to 50% active ingredient and 50 to 80% solvent or solvent-phenolic compound combination. Preferred solvents are methanol, dimethyl formamide, "Cellosolve," aqueous mixtures of these solvents, xylene, heavy aromatic naphtha, isophorone and combinations of any of these. Suspension formulations are generally preferred if the solubility of the active ingredient or active ingredients in the liquid carrier is less than about 0.1 percent.

For aerosol formulations low boiling halogenated hydrocarbons are preferred as solvents and propellants, although they can be partially replaced by low boiling hydrocarbons which act as propellants. Aerosol formulations ordinarily contain an organic or aqueous liquid in the range of 20 to 98% by weight based on the total weight of the pesticidal composition.

Formulations in the form of granules and pellets are physically stable, particulate compositions containing a compound of Formula 1 which adheres to or is distributed through a basic matrix of a coherent, inert carrier with macroscopic dimensions. In order to aid leaching of the active ingredient from the granulae or pellet, a surfactant can be present.

Suitable carriers are preferably of mineral origin such as natural clays, some pyrophyllites and vermiculite. Suitable surfactants are anionic or non-ionic.

For the granule compositions of this invention, most suitable carriers are of two types. The first are porous, absorptive, preformed granules, such as preformed and screened granular attapulgite or heat expanded, granular, screened vermiculite. On such preformed granules, a solution of the active agent can be sprayed and will be absorbed at concentrations up to 25 weight percent of the total weight. The active agent is preferably applied in a water solution when its solubility permits. In some instances, it is preferred to use hot rather than cold water to obtain a more concentrated spray solution. In other instances, an organic solvent or mixed organic-aqueous solvent is preferable to obtain increased solubility of the active ingredient. Ordinarily, if an organic solvent is used it is preferably selected from among methylene chloride, methyl cellosolve, dimethyl formamide and the like.

Preformed granules can also be treated with a melt of active ingredient if the active ingredient's melting point is sufficiently below its decomposition temperature. When this means of application is used, the active ingredient in a very finely divided form is deposited on the surface of the granules such as by tumbling in a mixer. The finely divided active agent can if desired contain minor amounts of diluents such as synthetic silicas, natural clays and surface active agents. After the active agent is distributed on the granules the granules are heated to above the melting point of the active agent preferably while tumbling is continued. The granules are then cooled and contain active ingredient within as well as fixed on their surfaces.

The second type of carrier suitable for granules as well as pellets is initially in a powder form. Powdered kaolin clays, hydrated attapulgite or bentonite clays such as sodium, calcium and magnesium bentonite are blended with the active ingredient and the mixtures are then granulated or pelleted. Water soluble salts can be included in the compositions to aid in disintegration of the granules and pellets in the presence of moisture. Such granules or pellets can be made containing 25 to 30 weight percent of active ingredient, but more frequently a concentration of 5 to 10 percent is preferred for optimum distribution. Such granular compositions are most useful in a size range of 15 to 60 mesh (U.S.S.), i.e. 0.25 to 1.4 millimeters.

The most preferred formulation for granules or pellets is 2 to 20 weight percent active ingredient, 0 to 5 weight percent surfactant and 75 to 98 percent inert mineral carrier.

Additional modifiers can be used to advantage in the compositions of this invention. Thus, although the compounds of Formula 1 are quite stable under most conditions, the use of a desiccant, buffering agent or materials such as urea, which inactivate catalytic sites on diluent particles can prove desirable. Additives which will inhibit corrosion, reduce foam, reduce caking and increase flocculation can also be used. In addition, bactericides, fungicides, bacteriostats and fungistats and other insecticides are often desirably present in the compositions of this invention in amounts of 0.025 to 10 parts by weight for each 1 part by weight of compound of Formula 1. Suitable biologically active compounds are mentioned below.

The compositions of this invention can be prepared by methods generally used for pesticidal compositions of similar type. The solid compositions, with the exception of granules and pellets are prepared in a blending operation and will usually include passage through a grinder such as an attrition mill, a hammer mill or a fluid energy mill.

Solutions are prepared by stirring the combined ingredients; in some cases warming may speed solution and in others cooling or pressure may be required to prevent evaporation of the solvent. Aqueous and oil suspensions are prepared by mixing the insoluble active ingredient and other ingredients and ball milling or sand grinding the mixture to produce a concentrated slurry of very finely divided particles.

Combinations

As mentioned above, in many instances it is advantageous to combine the compounds of Formula 1 with each other and with other pesticides. Such combinations can be made by the user at the time of application or prepared by a manufacturer as a ready-to-use formulation in one of the manners described above.

Among the advantages of combinations are control of pests with a smaller total amount of chemical; control of pairs or communities of pests and pathogens; and regulation of the degree of residual effect. All of these advantages can be accomplished merely by selecting chemicals for combination which complement one another in activity.

Ordinarily and chemicals combined will be used at from 0.1 to 3 times their normal use rate. However, rates are clearly dependent upon the specific chemicals combined, their intended use, and other obvious criteria.

Pesticides which can advantageously be combined with the compounds of Formula 1 include, but are not limited to, the following:

1,2,3,4,10,10-hexachloro-1,4,4a,5,8,8a-hexahydro-1,4-endoexo-5,8-dimethanonaphthalene (aldrin);
1,2,3,4,5,6-hexachlorocyclohexane (lindane);
1,2,4,5,6,7,8,8-octachloro-2,3,3a,4,7,7a-hexahydro-4,7-methanoindene (chlordane);
1,1,1-trichloro-2,2-bis(p-chlorophenyl)ethane (DDT);
1,2,3,4,10,10-hexachloro-6,7-epoxy-1,4,4a,5,6,7,8,8a-octahydro-1,4-endoexo-5,8-dimethanonaphthalene (dieldrin);
1,2,3,4,10,10-hexachloro-6,7-epoxy-1,4,4a,5,6,7,8,8a-octahydro-1,4-endoendo-5,6-dimethanonaphthalene (endrin);
1,(or 3a),4,5,6,7,8,8-heptachloro-3a,4,7,7a-tetrahydro-4,7-methanoindene;
1,1,1-trichloro-2,2-bis(p-methoxyphenyl)ethane (methoxychlor);
1,1,-dichloro-2,2-bis(p-chlorophenyl)ethane (TDE);
chlorinated camphene having a chlorine content of 67–69% (toxaphene);
chlorinated terpenes having a chlorine content of ca. 66% (Strobane®);
2-nitro-1,1-bis(p-chlorophenyl)butane;
1-naphthyl-N-methylcarbamate (carbaryl);
methylcarbamic acid, ester with 4-(dimethylamino)-3,5-dimethylphenol;
methylcarbamic acid, ester with 1,3-dithiolan-2-one oxime;
methyl N-methylthiolcarbamate;
methylmethylthiolcarbamate;
O,O-diethyl-O-[2-isopropyl-4-methylpyrimid-6-yl] thiophosphate(diazinon);
O,O-dimethyl-1-hydroxy-2,2,2-trichloroethyl phosphonate;
O,O-dimethyl-S-(1,2-dicarbethoxyethyl) dithiophosphate (malathion);
O,O-dimethyl-O-p-nitrophenyl thiophosphate (methyl parathion);
O,O-diethyl-O-p-nitrophenyl thiophosphate (parathion);
O,O-dimethyl-O-(3-chloro-4-nitrophenyl) thiophosphate;
di-2-cyclopentenyl-4-hydroxy-3-methyl-2-cyclopenten-1-one chrysanthemate;
O,O-dimethyl-O-(2,2-dichlorovinyl) phosphate (DDVF);
mixture containing 53.3% "Bulan," 26.7% "Prolan" and 20.0% related compounds;
O,O-dimethyl-O-(2,4,5-trichlorophenyl) phosphorothioate;
O,O-dimethyl-S-(4-oxo-1,2,3-benzotriazine-3(4H)-yl-methyl)phosphorodithioate (Guthion®);
bis-(dimethylamino)phosphonous anhydride;
O,O-diethyl-O-(2-keto-4-methyl-7-α'-pyranyl) thiophosphate;
O,O-diethyl (S-ethyl mercaptomethyl) dithiophosphate (phorate);
calcium arsenate;
sodium aluminofluoride;
dibasic lead arsenate;
2'-chloroethyl-1-methyl-2-(p-tert-butylphenoxy) ethyl sulfite;
azobenzene;
ethyl 2-hydroxy-2,2-bis(4-chlorophenyl) acetate;
O,O-diethyl-O-(2-(ethylmercapto)ethyl)thiophosphate;
2,4-dinitro-6-sec-butyl phenol;
O-ethyl-O-p-nitrophenylbenzenethiophosphonate (EPN),
4-chlorophenyl-4-chlorobenzene sulfonate;
p-chlorophenyl phenyl sulfone;
tetraethyl pyrophosphate;
1,1-bis(p-chlorophenyl)ethanol;
1,1-bis-(chlorophenyl)-2,2,2-trichloroethanol;
p-chlorophenyl p-chlorobenzyl sulfide;
bis-(p-chlorophenoxy)methane;
3-(1-methyl-2-pyrrolidyl)pyridine;
mixed esters of pyrethrolone and cinerolone keto-alcohols and two chrysanthemum acids;
cube and derris, both whole root and powdered;
ryanodine;
mixture of alkaloids known as veratrine;
dl-2-allyl-4-hydroxy-3-methyl-2-cyclopenten-1-one esterified with a mixture of cis and trans dl-chrysanthemum monocarboxylic acids;
butoxypolypropylene glycol;
p-dichlorobenzene;
2-butoxy-2'-thiocyanodiethyl ether;
naphthalene;
1,1-dichloro-2,2-bis(p-ethylphenyl) ethane;
p-dimethylaminobenzenediazo sodium sulfonate;
quinone oxyaminobenzooxohydrazone;
tetramethyl thiuram monosulfide;
tetramethyl thiuram disulfide (thiram);
metal salts of ethylene bisdithiocarbamic acid, e.g., manganese, zinc, iron and sodium salts;
pentachloronitrobenzene;
2,3-dihydro-5-carboxyanilido-6-methyl-1,4-oxathiin;
n-dodecylguanidine acetate (dodine);
N-trichloromethylthiotetrahydrophthalimide (captan);
phenylmercury acetate;
2,4-dichloro-6-(o-chloroanilino)-s-triazine (Dyrene®);
N-methylmercury p-toluenesulfonanilide;
chlorophenolmercury hydroxides;
nitrophenolmercury hydroxides;
ethylmercury acetate;
ethylmercury 2,3-dihydroxypropyl mercaptide;
methylmercury acetate;
methylmercury 2,3-dihydroxypropyl mercaptide (Ceresan®L);
3,3'-ethylenebis(tetrahydro-4,6-dimethyl-2H-1,3,5-thiadiazine-2-thione) (Cylan®);
methylmercury dicyandiamide;
N-ethylmercury p-toluenesulfonanilide;
1,4-dichloro-2,5-dimethoxy benzene (chloroneb);
metal (e.g., iron, sodium and zinc), ammonium and amine salts of dialkyldithiocarbamic acids;
tetrachloronitroanisole;
hexachlorobenzene;
hexachlorophene;
methylmercury nitrile;
tetrachloroquinone;
N-trichloromethylthiophthalimide;
5-ethoxy-3-trichloromethyl-1,2,4-thiadiazole;
1,2-dibromo-3-chloropropene;
dichloropropane—dichloropropene mixture;
ethylene dibromide;
1-chloro-2-nitropropane;
chloropicrin;
sodium dimethyldithiocarbamate;
tetrachloroisophthalonitrile;
2-carboxyamino-1-benzimidazolecarboxylic acid, dimethyl ester;
streptomycin;
2-(2,4,5-trichlorophenoxy)propionic acid;
p-chlorophenoxyacetic acid;
1-naphthaleneacetamide;
and
N-1-naphthylacetamide.

Of the above compounds, those which are insecticides and with which compounds of Formula 1 are preferably combined include DDT; TDE; EPN; "Azodrin®"; toxaphene; "Strobane®" and "Thiodan®".

Fungicides and fungistats of the above list with which compounds of Formula 1 are preferably combined include PCNB; thiram; dodine; maneb; methylmercury 2,3-dihydroxypropyl mercaptide; methylmercury acetate; N-ethylmercury p-toluenesulfonanilide; 1,4-dichloro-2,5-dimethoxybenzene; dimethyl ester of 2-carboxyamino-1-benzimidazolecarboxylic acid; N-trichloromethylthiotetrahydrophthalimide; N-trichlormethylthiphthalimide; sodium and calcium propionate; and 3,3'-ethylene-bis(tetrahydro-4,6-dimethyl-2H-1,3,5-thiadiazine-2-thione.

Bacteriostats and bacteriocides of the above list with which compounds of Formula 1 are preferably combined include tribasic copper sulfate and streptomycin sulfate.

Specific combinations which are preferred and their area of exceptional utility include:

(a) Methyl - O - (methylcarbamyl)thioacetohydroxamate and methyl O-carbamylthiolacetohydroxamate in ratios ranging from 1:4 to 4:1 for use on cotton plants.

(b) Methyl - O - (methylcarbamyl)thioacetohydroxamate and 1,4-dichloro-2,5-dimethoxybenzene (chloroneb) in ratios ranging from 1:6 to 6:1 for use on cotton seed. The chloroneb can be replaced in this combination by one of the following compounds, their mixtures with each other or their mixtures with chloroneb; pentachloronitrobenzene, captan; tetramethylthiuram disulfide; 1-chloro-2-nitropropane; 5-ethoxy-3-trichloromethyl-1,2,4-thiadiazole; and p-dimethylaminobenzene-diazo sodium sulfonate. Such combinations are useful on seeds other than cotton including both vegetable and agronomic crops.

(c) Methyl - O - (methylcarbamyl)thiolacetohydroxamate, chloroneb, and 2-carboxyamino-1-benzimidazolecarboxylic acid, dimethyl ester, in ratios ranging from 1:4:4 to 4:1:1, for use on cotton seed and other crop seed.

(d) Methyl O-carbamylthiolacetohydroxamate and DDT, in ratios ranging from 1:6 to 6:1 for use on cotton plants. In other combinations for this use, the DDT can be replaced by one of the following compounds, their mixtures with each other and their mixtures with DDT: endrin, carbaryl; malathion; methyl parathion; parathion; "Guthion®" and toxaphene.

(e) Methyl O - (methylcarbamyl)thioacetohydroxamate and 2-carboxyamino-1-benzimidazolecarboxylic acid, dimethyl ester, in ratios ranging from 1:3 to 3:1, for use on rice plants in seedbed, paddy or field for the control of insects and disease.

(f) Ethyl O-carbamylthiolacetohydroxamate combined with EPN, carbaryl, "Guthion®," malathion, methyl parathion or parathion, in ratios ranging from 1:4 to 4:1, for use on rice plants.

(g) Methyl O-carbamylthiolacetohydroxamate combined with DDT, endrin, EPN, toxaphene, malathion, parathion, "Guthion®," carbaryl or methoxychlor in ratios ranging from 1:5 to 5:1, for use on potato plants. The methyl O-carbamylthiolacetohydroxamate can be replaced in this combination by other compounds of Formula 1 such as methyl O-carbamylthiolpropionohydroxamate.

(h) Methyl O - (methylcarbamyl)thiolacetohydroxamate combined with parathion, aldrin, diazinon or phorate, in ratios ranging from 1:3 to 3:1 for application to soil prior to or during the planting of corn. The methyl O-(methylcarbamyl)thiolacetohydroxamate can be replaced in this combination by other compounds of Formula 1 such as ethyl O-(methylcarbamyl)thiolacetohydroxamate.

(i) Methyl O-(methylcarbamyl)thiolacetohydroxamate combined with DDT, methoxychlor, malathion, parathion, lead arsenate, "Guthion®," carbaryl or dieldrin in ratios ranging from 1:4 to 4:1, for use on apples and other crops.

(j) Methyl O - carbamylthiolacetohydroxamate combined with DDT, carbaryl, EPN, toxaphene, methoxychlor or diazinon, in ratios ranging from 1:5 to 5:1 for use on corn plants.

(k) Methyl O-carbamylthiolpropionohydroxamate combined with TDE, DDT, "Guthion®," malathion, diazinon, parathion or carbaryl, in ratios ranging from 1:6 to 6:1, for use on tobacco plants in seedbed or field. The methyl O-carbamylthiolpropionohydroxamate can be replaced in this combination by other compounds of Formula 1 such as methyl or ethyl O-(methylcarbamyl)thiolpropionohydroxamate.

(l) Ethyl O-carbamylthiolacetohydroxamate and chlordane, in ratios ranging from 1:8 to 8:1, for use on sugarcane seed pieces in the furrow at the time of planting.

(m) Methyl O - (methylcarbamyl)thioacetohydroxamate combined with toxaphene, carbaryl, endrin or "Guthion®," in ratios ranging from 1:12 to 12:1, for use on sugar-cane foliage.

(n) Methyl O - carbamylthiolacetohydroxamate combined with methoxychlor, carbaryl, malathion, DDT or toxaphene, in ratios ranging from 1:4 to 4:1, for use on shade trees or forest lands.

(i) Methyl O-(methylcarbamyl)thiolacetohydroxamate combined with chlordane, DDT, diazinon or parathion, in ratios ranging from 1:5 to 5:1, for use in soil prior to or during planting of potatoes.

(p) Methyl O-(methylcarbamyl)thiolacetohydroxamate plus "Guthion®," diazinon, malathion, parathion, methoxychlor, DDT, or toxaphene, in ratios ranging from 1:5 to 5:1, for use on cabbage or other cruciferous crops.

Complexes

The compounds of Formula 1 form crystalline complexes with compounds such as urea, thiourea, and dicyandiamide, hereinafter referred to as complexing agents, in 1:1 molar ratios. Such complexes can be prepared readily by dissolving equal molar proportions of a compound of Formula 1 and a complexing agent in a mutual solvent such as methanol and then allowing the solvent to evaporate.

The complexes thus formed are ordinarily crystalline solids having sharpe melting points. The solubility of the complex in many solvents will ordinarily differ from the parent compounds. These properties make the complexes particularly useful for isolating a compound of Formula 1 from its reaction mixture. They also make the complexes particularly suited for use in many formulation. Thus, for example, in the preparation of solutions, high-strength compositions and wettable powders complexes can be of particular advantage and in any of the compositions of this invention the complexes are ordinarily as suitable for use as, and should be regarded as the equivalent of, the compound of Formula 1.

Application

In applying the compounds of this invention for pest control, the compound, of course, is applied in an amount sufficient to exert the desired pesticidal action. The amounts required, however, to give pesticidal action are governed by such variables as temperature, time of the year, moisture, type of application, pests to be controlled, crop being treated and the like.

Compounds are applied to the locus or area to be protected. The application can be made directly upon the locus or area to be protected from pests during the period of infestation. Alternatively, the application can be made in advance of an anticipated infestation so that the pests will ingest or contact the active compound and be killed.

More particularly the compounds of Formula 1 can be used to control insects and mites attacking living plants, by distributing the compound over those plant surfaces already infested or subject to subsequent attack by these pests. Use rates for this type of application are in the range of 0.05 to 30 pounds of active ingredient per acre. More preferred rates are in the range of 0.1 to 15 pounds per acre and the most preferred rates in the range of 0.2 to 7 pounds per acre. Applications such as these may need to be repeated one or more times at intervals of 3 to 20 days. Such applications are made with any of a variety of widely available types of equipment regularly used to apply pesticides to plants. To facilitate applications of this nature, the compounds of this invention can be formulated to improve handleability or efficacy as described previously.

Other effectively methods of application include:

(a) Application to a part, such as the stem, of some plants, such as cotton, after which the chemical is systemically moved throughout the plant such that the entire plant is protected.

(b) Application to the seed of agricultural, horticultural and ornamental crops to protect the seed during storage and shipping prior to planting as well as to protect the seed and seedlings (as a result of systemic movement) from attack by insects and mites after planting. The preferred rates for application to seed are in the range of .01 to 30 ounces of the active compound of this invention per 100 pounds of seed. The most preferred rates are in the range of 1 to 10 ounces per 100 pounds of seed.

(c) Application to soil in which plants are to be planted or are growing to protect seed and plants from attack by insects and mites. Such protection is against both soil insects attacking the roots and insects and mites attacking the above-ground parts of the plants. Preferred use rates are in the range of 0.1 to 50 pounds of active ingredient per acre of area actually treated. The most preferred rates are in the range of 0.25 to 20 pounds per acre. Such application includes placing the pesticidal composition in the furrow at the time of planting; mixing the composition into the soil at or after planting; and depositing the composition on the surface of the soil after planting so that it is carried down into the soil by rainfall or irrigation. Granular formulations are particularly useful in this type of application although other formulations can be used effectively.

(d) Application to the walls and floors of structures to control insects, ticks and mites. Such applications to be repeated as needed. Preferred use rates for such applications are in the range of .001 to 2 pounds of active ingredients per 1,000 square feet of surface treated. The most preferred rates are in the range of .01 to 0.4 pound of active per 1,000 square feet of surface.

(e) Application to animals to control insects, ticks and mites causing injury or annoyance, or dissemination of disease. The compound of this invention to be applied to the animals to be protected by sprays, dusts or dips in such a way as to give a more or less uniform coating. Such applications to be repeated as needed.

(f) To land areas (including marsh or swamp) for the control of insects, ticks or mites causing injury or annoyance or disseminating disease to humans or animals. Preferred use rates are in the range of .01 to 9 pounds of active compound of this invention per acre 1 to 5 times a year. The most preferred rates are in the range of .03 to 3 pounds of active per acre on the same schedule.

In all of the applications enumerated above ((a) through (f)) the distribution of the compounds of this invention may be simplified and made more accurate through the use of the formulations and compositions described previously.

The following examples illustrate the invention. References to parts or percentages are by weight unless otherwise specified. The compounds referred to in the examples as well as those referred to above and represented by Formulae 1 and 2 can exist as syn- and anti-isomers or as mixtures of these isomers.

EXAMPLE 1

To a slowly stirred mixture of 10.5 parts of methyl thiolacetohydroxamate, 50 parts of benzene and 13 parts of sodium cyanate, is added 15 parts of trifluoroacetic acid. The temperature rises to 32° C. and is held there by external cooling. After addition of 50 parts of methylene chloride, the mixture is stirred for several hours, and then treated with 25 parts of water. A small amount of insoluble material is filtered off. The two phases of the filtrate are separated and the aqueous phase is re-extracted with methylene chloride. Evaporation of the combined organic phases gives 5 parts of an oily solid which is recrystallized from isopropanol to yield 3.7 parts of methyl O-carbamylthiolacetohydroxamate.

The methyl O-carbamylthiolacetohydroxamate is formulated and applied as follows:

| | Percent |
|---|---|
| Methyl O-carbamylthiolacetohydroxamate | 5.0 |
| Sodium dioctyl sulfosuccinate | 0.5 |
| Polymerized alkylarylsulfonates | 1.0 |
| Pyrophyllite | 68.5 |
| Attapulgite clay | 25.0 |

All the ingredients except the pyrophyllite are briefly blended, passed through a micropulverizer to produce a wettable powder with particles substantially all below 50 microns and then thoroughly blended with the pyrophyllite before packaging.

The dilute dust is applied in thorough coverage by means of a crank-operated duster to both upper and lower surfaces of the foliage of roses. Infesting aphids such as the potato aphid *Macrosiphum solanifolii* and the rose aphid *Macrosiphum rosae* are effectively controlled by this application. All other compounds of Formula 1 can be formulated and applied in like manner.

EXAMPLE 2

| | Percent |
|---|---|
| Methyl O-carbamylthiolacetohydroxamate | 95.0 |
| Synthetic silica | 5.0 |

The above high-strength composition is prepared by coarse grinding and screening through a screen having 16 meshes/cm.

This composition is added to water in an amount to provide 0.25 pound of the active ingredient per 100 gallons. After an adequate time has passed to allow the active compound to go into solution, ordinarily between 2 and 10 minutes depending upon the temperature of the water, the resulting solution is applied as a wetting spray to cabbage plants on which cabbage loopers, *Triohoplusia ni*, are feeding. All of the cabbage loopers are killed by the spray.

DDT can be added to the above spray at the rate of 1.0 pound of active ingredient per 100 gallons. Such addition results in much improved control of harlequin bugs and stink bugs which often occur on cabbage along with cabbage loopers.

EXAMPLE 3

| | Percent |
|---|---|
| Methyl O-carbamylthiolacetohydroxamate | 25.0 |
| Dimethyl formamide | 25.0 |
| Methanol | 50.0 |

The above water-soluble concentrate is prepared by stirring the ingredients in a mixer. The concentrate is then added to water in an amount sufficient to provide 0.5 pound of the active ingredient per 100 gallons. White-marked tussock moths (*Hemerocampa leucostigma*) feeding on blueberry plants are killed when the plants are sprayed at the rate of 100 gallons per acre with the water dilution.

EXAMPLE 4

| | Percent |
|---|---|
| Methyl O-carbamylthiolacetohydroxamate | 25.0 |
| Dimethyl formamide | 35.0 |
| Methyl cellosolve | 40.0 |

The above water-soluble concentrate is prepared by stirring the ingredients in a mixer. The concentrate is then used to treat cotton seed at a rate of 6 ounces of the active ingredient per 100 pounds of seed. Seed treated in this way grow to produce seedlings which kill cotton aphids (*Aphis gossypil*) which feed upon them up to 3 weeks or more after planting. Cotton survival is improved if chloroneb is also applied to the cotton seed along with the above concentrate at the rate of 6 ounces of active per 100 pounds of seed. And cotton survival is further improved if, as a third component of the treating preparation, "Ceresan®L" is applied in an amount to provide 3 ounces of Ceresan®L per 100 pounds of cotton seed. The chloroneb in this mixture can be replaced by one or more of the following: pentachloronitrobenzene; captan; tetramethyl-thiuram disulfide; 1-chloro-2-nitropropane; 5-ethoxy-3-trichloromethyl-1,2,4-thiadiazole; and p-dimethylaminobenzene-diazo sodium sulfonate.

EXAMPLES 5–11

The following compounds are made in the manner of methyl O-carbamylthiolacetohydroxamate of Example 1 by substituting an equivalent weight of the indicated starting material. The product is formulated and applied as in Example 1 to provide like results.

| Ex. | Starting material | Product |
| --- | --- | --- |
| 5 | Methyl acetohydroxamate. | Methyl O-carbamylacetohydroxamate. |
| 6 | n-Butyl propionohydroxamate. | n-Butyl O-carbamylpropionohydroxamate. |
| 7 | n-Butyl thiolpropionohydroxamate. | n-Butyl O-carbamylthiolpropionohydroxamate. |
| 8 | Methyl thiolpropionohydroxamate. | Methyl O-carbamylthiolpropionohydroxamate. |
| 9 | Ethyl thiolacetohydroxamate. | Ethyl O-carbamylthiolacetohydroxamate. |
| 10 | Methyl thioisobutyrohydroxamate. | Methyl O-carbamylthioisobutyrohydroxamate. |
| 11 | Benzyl thiolacetohydroxamate. | Benzyl O-carbamylthiolacetohydroxamate. |

EXAMPLE 12

To a stirred suspension of 48 parts of 50% sodium hydride in mineral oil and 1170 parts of tetrahydrofuran is added in portions 201.5 parts of methyl p-chlorothiolbenzohydroxamate. The resulting sodium salt suspended in tetrahydrofuran is added in portions to 297 parts of phosgene in 1420 parts of ethyl ether maintained at 0–5° C. The excess phosgene is removed by distillation at reduced pressure. The resulting mixture is added in portions to 34 parts of ammonia dissolved in 1050 parts acetonitrile maintained at 0–10° C. After warming to ambient temperature the solids are filtered off and the filtrate is extracted with hexane to remove mineral oil. The solvent is then removed yielding methyl O-carbamyl-p-chlorothiolbenzohydroxamate, which is recrystallized from ethanol-water.

EXAMPLES 13–16

The following compounds are made in the manner of methyl O-(carbamyl)-p-chlorothiolbenzohydroxamate of Example 12 by substituting an equivalent weight of the indicated starting material.

| Ex. | Starting material | Product |
| --- | --- | --- |
| 13 | Methyl p-methylthiolbenzohydroxamate. | Methyl p-methyl-O-carbamylthiolbenzohydroxamate. |
| 14 | Methyl o-n-butoxythiolbenzohydroxamate. | Methyl o-n-butoxy-O-carbamylthiolbenzohydroxamate. |
| 15 | Methyl p-bromothiolbenzohydroxamate. | Methyl O-carbamyl-p-bromothiolbenzohydroxamate. |
| 16 | Methyl p-chlorobenzohydroxamate. | Methyl O-carbamyl-p-chlorobenzohydroxamate. |

EXAMPLE 17

To a stirred solution composed of 201.5 parts of methyl p-chlorothiolbenzohydroxamate and 2 parts of 1,4-di-azabicyclo[2,2,2]octane in 1000 parts of benzene is added 65 parts of methyl isocyanate. After addition, the reaction mixture is heated at 40–50° C. for one hour. The solvent is removed under reduced pressure yielding methyl p-chloro-O-(methylcarbamyl)thiolbenzohydroxamate as a white solid. The product is purified by recrystallization from a mixture of benzene and cyclohexane.

The product, methyl p-chloro-O-(methylcarbamyl) thiolbenzohydroxamate, is formulated and applied as follows:

| | Percent |
| --- | --- |
| Methyl p-chloro-O-(methylcarbamyl)-thiolbenzohydroxamate | 50.0 |
| Dioctyl sodium sulfosuccinate | 1.5 |
| Sodium lignin sulfonate | 4.0 |
| Methylated cellulose | 1.0 |
| Fine silica | 43.5 |

The above components are blended and micopulverized to a particle size essentially less than 50 microns. The product can be used as a wettable powder or as a dust base.

A 10% active dust is prepared by blending the ingredients below in an efficient mixer such as a twin-shell blender prior to use:

| | Percent |
| --- | --- |
| Wettable powder described above | 20.0 |
| Pulverized talc | 80.0 |

The above dust formulation is applied to sweet corn by means of a tractor-powered duster at the rate of 10 to 20 pounds of dust per acre. Infestations of the corn earworm, *Heliothis zea* are effectively controlled by this application.

Methyl p-fluoro-O-(methylcarbamyl)thiolbenzohydroxamate can be formulated and used in like manner.

EXAMPLES 18–115

The following compounds are made in the manner of methyl p-chloro-O-(methylcarbamyl)thiolbenzohydroxamate of Example 17 by substituting an equivalent weight of the indicated starting material for the methyl p-chlorothiolbenzohydroxamate of Example 17. The product is formulated and applied in like manner to provide like results.

| Ex. | Starting material | Product |
| --- | --- | --- |
| 18 | Methyl acetohydroxamate. | Methyl O-(methylcarbamyl)-acetohydroxamate. |
| 19 | Methyl n-butyrohydroxamate. | Methyl O-(methylcarbamyl)-n-butyrohydroxamate. |
| 20 | Ethyl acetohydroxamate. | Ethyl O-(methylcarbamyl)-acetohydroxamate. |
| 21 | Methyl propionohydroxamate. | Methyl O-(methylcarbamyl)-propionohydroxamate. |
| 22 | Methyl trichloroacetohydroxamate. | Methyl O-(methylcarbamyl)-trichloroacetohydroxamate. |
| 23 | Methyl n-hexanohydroxamate. | Methyl O-(methylcarbamyl)-n-hexanohydroxamate. |
| 24 | n-Hexyl acetohydroxamate. | n-Hexyl O-(methylcarbamyl)-acetohydroxamate. |
| 25 | Methyl thiolpropionohydroxamate. | Methyl O-(methylcarbamyl)-thiolpropionohydroxamate. |
| 26 | Methyl thiolhexanohydroxamate. | Methyl O-(methylcarbamyl)-thiolhexanohydroxamate. |
| 27 | Methyl thiolacetohydroxamate. | Methyl O-(methylcarbamyl)-thiolacetohydroxamate. |
| 28 | Methyl perfluorothiolhexanohydroxamate. | Methyl O-(methylcarbamyl)-perfluorothiolhexanohydroxamate. |
| 29 | Methyl pentachlorothiolpropionohydroxamate. | Methyl O-(methylcarbamyl)-pentachlorothiolpropionohydroxamate. |
| 30 | Ethyl thiolacetohydroxamate. | Ethyl O-(methylcarbamyl)-thiolacetohydroxamate. |
| 31 | Methyl thioisobutyrohydroxamate. | Methyl O-(methylcarbamyl)-thioisobutyrohydroxamate. |
| 32 | Ethyl 2-methoxythiolacetohydroxamate. | Ethyl O-(methylcarbamyl)-2-methoxythiolacetohydroxamate. |
| 33 | n-Hexyl 3-methoxythiolpropionohydroxamate. | n-Hexyl O-(methylcarbamyl)-3-methoxythiolpropionohydroxamate. |
| 34 | Methyl 3-isopropoxythiolpropionohydroxamate. | Methyl O-(methylcarbamyl)-3-isopropoxythiolpropionohydroxamate. |
| 35 | Isopropyl thiolacetohydroxamate. | Isopropyl O-(methylcarbamyl)-thiolacetohydroxamate. |
| 36 | p-Chlorobenzyl trichlorothiolacetohydroxamate. | p-Chlorobenzyl O-(methylcarbamyl) trichlorothiolacetohydroxamate. |
| 37 | Methyl trichlorothiolacetohydroxamate. | Methyl O-(methylcarbamyl)-trichlorothiolacetohydroxamate. |
| 38 | Methyl chloroacetohydroxamate. | Methyl O-(methylcarbamyl)-chloroacetohydroxamate. |
| 39 | n-Butyl 3-chloropropionohydroxamate. | n-Butyl O-(methylcarbamyl)-3-chloropropionohydroxamate. |
| 40 | Ethyl 3,4-dichlorobutyrohydroxamate. | Ethyl O-(methylcarbamyl)-3,4-dichlorobutyrohydroxamate. |
| 41 | Methyl 4,4,4-tribromobutyrohydroxamate. | Methyl O-(methylcarbamyl)-4,4,4-tribromobutyrohydroxamate. |
| 42 | n-Butyl 2-fluoropropionohydroxamate. | n-Butyl O-(methylcarbamyl)-2-fluoropropionohydroxamate. |
| 43 | Methyl 3-methoxypropionohydroxamate. | Methyl O-(methylcarbamyl)-3-methoxypropionohydroxamate. |
| 44 | Methyl carbomethoxyacetohydroxamate. | Methyl O-(methylcarbamyl)-carbomethoxyacetohydroxamate. |
| 45 | Methyl cyclopentanecarbohydroxamate. | Methyl O-(methylcarbamyl)-cyclopentanecarbohydroxamate. |
| 46 | Ethyl 3-(methylthio)propionohydroxamate. | Ethyl O-(methylcarbamyl)-3-(methylthio)propionohydroxamate. |
| 47 | Methyl p-chlorobenzohydroxamate. | Methyl p-chloro-O-(methylcarbamyl)-benzohydroxamate. |
| 48 | Methyl p-bromobenzohydroxamate. | Methyl p-bromo-O-(methylcarbamyl)-benzohydroxamate. |
| 49 | Isopropyl thioisobutyrohydroxamate. | Isopropyl O-(methylcarbamyl)-thioisobutyrohydroxamate. |
| 50 | Methyl thiolpivalohydroxamate. | Methyl O-(methylcarbamyl)-thiolpivalohydroxamate. |

TABLE—Continued

| Ex. | Starting material | Product |
|---|---|---|
| 51 | Benzyl thiolacetohydroxamate. | Benzyl O-(methylcarbamyl)-thiolacetohydroxamate. |
| 52 | p-Chlorobenzyl thiolacetohydroxamate. | p-Chlorobenzyl O-(methylcarbamyl)-thiolacetohydroxamate. |
| 53 | Methyl chlorothiolacetohydroxamate. | Methyl O-(methylcarbamyl)-chlorothiolacetohydroxamate. |
| 54 | n-Butyl 3-chlorothiolpropionohydroxamate. | n-Butyl O-(methylcarbamyl)-3-chlorothiolpropionohydroxamate. |
| 55 | Ethyl 3,4-dichlorothiolbutyrohydroxamate. | Ethyl O-(methylcarbamyl)-3,4-dichlorothiolbutyrohydroxamate. |
| 56 | Methyl 4,4,4-tribromothiolbutyrohydroxamate. | Methyl O-(methylcarbamyl)-4,4,4-tribromothiolbutyrohydroxamate. |
| 57 | Methyl 3-chlorothiolpropionohydroxamate. | Methyl O-(methylcarbamyl)-3-chlorothiolpropionohydroxamate. |
| 58 | n-Butyl 2-fluorothiolpropionohydroxamate. | n-Butyl O-(methylcarbamyl)-2-fluorothiolpropionohydroxamate. |
| 59 | Methyl perfluorothiolpropionohydroxamate. | Methyl O-(methylcarbamyl)-perfluorothiolpropionohydroxamate. |
| 60 | Methyl 2-(methylthio)-thiolacetohydroxamate. | Methyl O-(methylcarbamyl)-2-(methylthio)thiolacetohydroxamate. |
| 61 | Methyl 4-(methylthio)-thiolbutyrohydroxamate. | Methyl O-(methylcarbamyl)-4-(methylthio)thiolbutyrohydroxamate. |
| 62 | Methyl thiolcyclopropanecarbohydroxamate. | Methyl O-(methylcarbamyl)-thiolcyclopropanecarbohydroxamtae. |
| 63 | Methyl thiolcyclopentanecarbohydroxamate. | Methyl O-(methylcarbamyl)-thiolcyclopentanecarbohydroxamate. |
| 64 | Methyl thiol-1-naphthohydroxamate. | Methyl O-(methylcarbamyl)-thiol-1-napthohydroxamate. |
| 65 | Methyl thiol-2-naphthohydroxamate. | Methyl O-(methylcarbamyl)-thiol-2-napthohydroxamate. |
| 66 | Methyl carboethoxythiolformohydroxamate. | Methyl O-(methylcarbamyl)-carboethoxythiolformohydroxamate. |
| 67 | Methyl thiolbenzohydroxamate. | Methyl O-(methylcarbamyl)-thiolbenzohydroxamate. |
| 68 | Ethyl thiolpropionohydroxamate. | Ethyl O-(methylcarbamyl)thiolpropionohydroxamate. |
| 69 | Propyl thiolhexanohydroxamate. | Propyl O-(methylcarbamyl)thiolhexanohydroxamate. |
| 70 | Ethyl m-chlorothiolbenzohydroxamate. | Ethyl m-chloro-O-(methylcarbamyl)-thiolbenzohydroxamate. |
| 71 | Methyl p-bromothiolbenzohydroxamate. | Methyl p-bromo-O-(methylcarbamyl)-thiolbenzohydroxamate. |
| 72 | Methyl p-(trifluoromethyl)thiolbenzohydroxamate. | Methyl p-(trifluoromethyl)-O-(methylcarbamyl)thiolbenzohydroxamate. |
| 73 | n-Butyl p-sec-butyl-thiolbenzohydroxamate. | n-Butyl p-sec-butyl-O-(methylcarbamyl)thiolbenzohydroxamate. |
| 74 | Methyl carbomethoxythiolacetohydroxamate. | Methyl O-(methylcarbamyl)-carbomethoxythiolacetohydroxamate. |
| 75 | Methyl p-methoxythiolbenzohydroxamate. | Methyl O-(methylcarbamyl)-p-methoxythiolbenzohydroxamate. |
| 76 | Methyl o-fluorothiolbenzohydroxamate. | Methyl O-(methylcarbamyl)-o-fluorothiolbenzohydroxamate. |
| 77 | n-Propyl o-methoxythiolbenzohydroxamate. | n-Propyl o-methoxy-O-(methylcarbamyl)thiolbenzohydroxamate. |
| 78 | Methyl p-ethylthiolbenzohydroxamate. | Methyl O-(methylcarbamyl)-p-ethylthiolbenzohydroxamate. |
| 79 | Methyl p-dimethylaminothiolbenzohydroxamate. | Methyl O-(methylcarbamyl)-p-dimethylaminothiolbenzohydroxamate. |
| 80 | Methyl m-nitrothiolbenzohydroxamate. | Methyl O-(methylcarbamyl)-m-nitrothiolbenzohydroxamate. |
| 81 | Methyl p-cyanothiolbenzohydroxamate. | Methyl O-(methylcarbamyl)-p-cyanothiolbenzohydroxamate. |
| 82 | Methyl p-nitrothiolbenzohydroxamate. | Methyl O-(methylcarbamyl)-p-nitrothiolbenzohydroxamate. |
| 83 | Methyl 2-bromo-4-chloro thiolbenzohydroxamate. | Methyl O-(methylcarbamyl)-2-bromo-4-chlorothiolbenzohydroxamate. |
| 84 | Methyl 3,4-dichlorothiolbenzohydroxamate. | Methyl O-(methylcarbamyl)-3,4-dichlorothiolbenzohydroxamate. |
| 85 | Methyl 2,4,5-trichlorothiolbenzohydroxamate. | Methyl O-(methylcarbamyl)-2,4,5-trichlorothiolbenzohydroxamate. |
| 86 | Methyl 3,4,5-trichlorothiolbenzohydroxamate. | Methyl O-(methylcarbamyl)-3,4,5-trichlorothiolbenzohydroxamate. |
| 87 | Methyl 5-chloro-2-methoxythiolbenzohydroxamate. | Methyl O-(methylcarbamyl)-5-chloro-2-methoxythiolbenzohydroxamate. |
| 88 | Methyl 2-chloro-4-cyanothiolbenzohydroxamate. | Methyl O-(methylcarbamyl)-2-chloro-4-cyanothiolbenzohydroxamate. |
| 89 | Methyl 4-bromo-2-methylthiolbenzohydroxamate. | Methyl O-(methylcarbamyl)-4-bromo-2-methylthiolbenzohydroxamate. |
| 90 | Methyl 2-chloro-4-nitrothiolbenzohydroxamate. | Methyl O-(methylcarbamyl)-2-chloro-4-nitrothiolbenzohydroxamate. |
| 91 | Methyl 3-chloro-4-dimethylaminothiolbenzohydroxamate. | Methyl O-(methylcarbamyl)-3-chloro-4-dimethylaminothiolbenzohydroxamate. |
| 92 | Methyl 2-chloro-4-(trifluoromethyl)thiolbenzohydroxamate. | Methyl O-(methylcarbamyl)-2-chloro-4-trifluoromethylthiolbenzohydroxamate. |
| 93 | Methyl 3-bromothiolpropionohydroxamate. | Methyl O-(methylcarbamyl)-3-bromothiolpropionohydroxamate. |
| 94 | Methyl carbobutoxythiolacetohydroxamate. | Methyl O-(methylcarbamyl)-carbobutoxythiolacetohydroxamate. |
| 95 | Methyl 3-carbomethoxythiolpropionohydroxamate. | Methyl O-(methylcarbamyl)-3-carbomethoxythiolpropionohydroxamate. |
| 96 | Methyl carbopentoxythiolformohydroxamate. | Methyl O-(methylcarbamyl)-carbopentoxythiolformohydroxamate. |
| 97 | n-Hexyl thiolacetohydroxamate. | n-Hexyl O-(methylcarbamyl)-thiolacetohydroxamate. |
| 98 | Methyl 3-(methylthio)-thiolpropionohydroxamate. | Methyl O-(methylcarbamyl)-3-(methylthio)thiolpropionohydroxamate. |
| 99 | Propyl thiol-4-methylvalerohydroxamate. | Propyl O-(methylcarbamyl)-thiol-4-methylvalerohydroxamate. |
| 100 | Methyl methoxythiolacetohydroxamate. | Methyl O-(methylcarbamyl)-methoxythiolacetohydroxamate. |
| 101 | Methyl o-methylthiolbenzohydroxamate. | Methyl O-(methylcarbamyl)-o-methylthiolbenzohydroxamate. |
| 102 | Methyl 4-tert-butyl-thiolbenzohydroxamate. | Methyl O-(methylcarbamyl)-4-tert-butylthiolbenzohydroxamate. |
| 103 | Methyl 3-bromo-4-sec-butylthiolbenzohydroxamate. | Methyl O-(methylcarbamyl)-3-bromo-4-sec-butylthiolbenzohydroxamate. |
| 104 | Methyl 2-n-butoxy-3-nitrothiolbenzohydroxamate. | Methyl O-(methylcarbamyl)-2-n-butoxy-3-nitrothiolbenzohydroxamate. |
| 105 | Methyl 2-methoxythiolbenzohydroxamate. | Methyl O-(methylcarbamyl)-2-methoxythiolbenzohydroxamate. |

EXAMPLE 106

To a stirred suspension of 48 parts of 50% sodium hydride with mineral oil in 730 parts of tetrahydrofuran is added over a one hour period 89 parts of methyl thiolacetohydroxamate. The temperature is maintained at 20–30° C. After gas evolution subsides, 107.5 g. of dimethylcarbamyl chloride is added over a one hour period with the temperature kept between 15 and 25° C. Stirring is continued for one hour at room temperature and the solids are removed by filtration. The solvent is removed under reduced pressure yielding methyl O-(dimethylcarbamyl) thiolacetohydroxamate.

The product, methoyl O-(dimethylcarbamyl)thiolacetohydroxamate, is formulated and applied as follows:

|  | Percent |
|---|---|
| Methyl O - (dimethylcarbamyl)thiolacetohydroxamate | 25.0 |
| Sodium alkylnaphthalenesulfonate | 2.0 |
| Sodium lignosulfonate | 2.0 |
| Dextrin | 4.0 |
| Attapulgite | 67.0 |

The ingredients are blended, coarsely ground through a hammer mill and then passed through a fluid energy mill to produce particles substantially all below 10 microns.

The house fly, *Musca domestica*, is controlled in barns by using 1 pound of the above formula in 2.5 gallons of water and spraying the walls, floors, cracks, crevices, stalls and pens with a knapsack sprayer to run-off.

EXAMPLES 107–121

The following compounds are made in the manner of methyl O-(dimethylcarbamyl)thiolacetohydroxamate of Example 106 by substituting an equivalent weight of the indicated starting material for the methyl thiolacetohydroxamate of Example 106. The product is formulated and applied in like manner to provide like results.

| Ex. | Starting material | Product |
|---|---|---|
| 107 | Methyl thiolisobutyrohydroxamate. | Methyl O-(dimethylcarbamyl)-thiolisobutyrohydroxamate. |
| 108 | Methyl p-chlorothiolbenzohydroxamate. | Methyl O-(dimethylcarbamyl)-p-chlorothiolbenzohydroxamate. |
| 109 | Ethyl thiolacetohydroxamate. | Ethyl O-(dimethylcarbamyl)-thiolacetohydroxamate. |
| 110 | Methyl n-butyrohydroxamate. | Methyl O-(dimethylcarbamyl)-n-butyrohydroxamate. |
| 111 | Methyl p-chlorobenzohydroxamate. | Methyl O-(dimethylcarbamyl)-p-chlorobenzohydroxamate. |
| 112 | Methyl acetohydroxamate. | Methyl O-(dimethylcarbamyl)-acetohydroxamate. |
| 113 | Benzyl acetohydroxamate. | Benzyl O-(dimethylcarbamyl)-acetohydroxamate. |
| 114 | Methyl 2-(methylthio)-thioacetohydroxamate. | Methyl O-(dimethylcarbamyl)-2-(methylthio)thiolacetohydroxamate. |
| 115 | n-Butyl thiolacetohydroxamate. | n-Butyl O-(dimethylcarbamyl)-thiolacetohydroxamate. |
| 116 | Methyl p-bromothiolbenzohydroxamate. | Methyl O-(dimethylcarbamyl)-p-bromothiolbenzohydroxamate. |
| 117 | Isopropyl thiolacetohydroxamate. | Isopropyl O-(dimethylcarbamyl)-thiolacetohydroxamate. |
| 118 | Isopropyl thiolisobutyrohydroxamate. | Isopropyl O-(dimethylcarbamyl)-thiolisobutyrohydroxamate. |
| 119 | Methyl 3-methoxythiolpropionohydroxamate. | Methyl O-(dimethylcarbamyl)-3-methoxythiolpropionohydroxamate. |
| 120 | Ethyl thiolpropionohydroxamate. | Ethyl O-(dimethylcarbamyl)-thiolpropionohydroxamate. |
| 121 | Benzyl thiolacetohydroxamate. | Benzyl O-(dimethylcarbamyl)-thiolacetohydroxamate. |

EXAMPLE 122

Preparation of methyl thiolacetimidate hydrochloride intermediate

A total of 41 parts by weight of acetonitrile, 250 parts by weight of anhydrous ether and 48 parts by weight of methyl mercaptan are stirred and maintained in an atmosphere of nitrogen as 36.5 parts by weight of dry HCl are gradually added to the mixture. Near the end of the HCl addition the clear solution becomes cloudy and a precipitate begins to form. The white crystals that form are collected by filtration, rinsed with cold ether, and dried in a vacuum oven at room temperature. A total of 83 parts by weight of hygroscopic, white, crystalline methyl thiolacetimidate hydrochloride is obtained, melting at 81–89° C.

Other imidate intermediates used in this invention can be made similarly with corresponding alcohols, mercaptans and nitriles.

These imidates are reacted with hydroxylamine hydrochloride in the presence of pyridine to give the corresponding reaction intermediate hydroxamates.

EXAMPLE 123

To a stirred solution of 105 parts of methyl thiolacetohydroxamate in 400 parts of methylene chloride, at 25° C. is added 60 parts of methyl isocyanate. The temperature rises during addition until the solvent begins to reflux. After the evolution of heat diminishes the mixture is heated to reflux and stirred for an additional 45 minutes. After removal of the solvent and drying, methyl O-(methylcarbamyl)thiolacetohydroxamate is obtained as a white solid.

The product is then purified by recrystallization from water, and is formulated and applied as follows:

| | Percent |
|---|---|
| Methyl O-(methylcarbamyl)thiolacetohydroxamate | 97.5 |
| Synthetic silica | 2.5 |

The above high-strength composition is prepared by coarse grinding the ingredients and then passing them through a screen having 16 meshes/cm. On adding the concentrate to water at normal use ratio, the active ingredient dissolves.

Thus, the concentrated composition is added to water in an amount to provide 0.75 lb. of active insecticide per 100 gallons of water. Also added to the same water is a wettable powder formulation of 2-carboxyamino-1-benzimidazolecarboxylic acid, dimethyl ester, in an amount to furnish 0.75 pound of the active fungicide per 100 gallons. The water containing the compound of Formula 1 and the fungicide is sprayed weekly on field rice at the rate of 100 gallons per acre providing control of the Oriental rice borer, *Chilo simplex,* and rice blast disease.

EXAMPLE 124

| | Percent |
|---|---|
| Methyl O-(methylcarbamyl)-p-chlorothiolbenzohydroxamate | 94.0 |
| Kaolinite | 4.0 |
| Sodium alkylnaphthalenesulfonate | 2.0 |

This mixture is blended and coarsely micropulverized.

This high-strength composition can be used in this form or further diluted into other useful preparations, which may contain the above compound as the only active ingredient or may contain other pesticides.

The formulation as prepared here is added to water in an amount to provide 0.4 pound of the active compound of this invention per 100 gallons. Also added to this same water is an amount of a commercial malathion formulation to provide 1.0 pound of malathion active per 100 gallons. The water containing the two active ingredients is sprayed on tobacco in the field at 10-day intervals controlling tobacco budworms, *Heliothis virescens,* tobacco hornworms, *Protoparee sexta,* and grasshoppers. The malathion contributes largely to the control of the grasshoppers. When other insects such as June beetles, suckflies or vegetable weevils are present the malathion can be replaced with TDE, DDT, "Guthion®," diazinon, parathion or carbaryl.

EXAMPLE 125

| | Percent |
|---|---|
| Butyl O-(methylcarbamyl)thiolacetohydroxamate | 75.0 |
| Sodium alkylnaphthalenesulfonate | 2.0 |
| Sodium ligninsulfonate | 2.0 |
| Dextrin | 4.0 |
| Attapulgite | 17.0 |

The ingredients are blended, coarsely ground through a hammer mill and then passed through a fluid energy mill to produce particles substantially all below 10 microns.

The house fly, *Musca domestica,* is controlled in barns by using 1 pound of the above formulation in 2.5 gallons of water and spraying the walls, floors, cracks, crevices, stalls and pens with a knapsack sprayer to run-off. Isopropyl O - (methylcarbamyl)thiolisobutyrohydroxamate and ethyl O-(methylcarbamyl)thiolacetohydroxamate can be formulated and applied in like manner, with similar results.

EXAMPLE 126

| | Percent |
|---|---|
| Isopropyl O - (methylcarbamyl)thiolacetohydromate | 35.0 |
| Ethylene oxide condensate with nonylphenol | 4.0 |
| Calcium ligninsulfonate | 2.0 |
| Synthetic fine silica | 5.0 |
| Kaolinite | 54.0 |

While blending the dry ingredients, the liquid wetting agent is sprayed upon them. The blended composition is then passed through an impact mill and finally reblended.

EXAMPLE 127

| | Percent |
|---|---|
| Methyl p - chloro - O-(methylcarbamyl)thiolbenzohydroxamate | 25.00 |
| Mixed calcium and sodium ligninsulfonate | 6.00 |
| Hydrated attapulgite | 2.00 |
| Monobasic potassium phosphate | 1.00 |
| Phenylmercury acetate | 0.25 |
| Water | 65.75 |

The solid ingredients are blended and micropulverized, mixed with the water and the resulting slurry is sand ground in conventional equipment to produce particles substantially all below 2 microns. This formulation is diluted with water and applied to cotton infested with the boil weevil, *Anthonomus grandis*, by means of a tractor-mounted sprayer at the rate of 0.5 to 2 pounds of active ingredient per acre. The infestation is effectively controlled by this application.

EXAMPLE 128

| | Percent |
|---|---|
| Methyl O - (methylcarbamyl) - p-bromothiolbenzohydroxamate | 40.0 |
| Polyoxyethylene sorbitol heptaoleate | 8.0 |
| Synthetic fine silica | 1.0 |
| Paraffinic hydrocarbon oil | 51.0 |

The slurry is sand ground to produce particles substantially all below 5 microns. The composition is emulsifiable in water.

This formulation is added to water in an amount to provide 0.25 pound of active ingredient per 100 gallons. The resulting solution-suspension is sprayed on appletrees on a weekly schedule providing control of green peach aphid, *Myzus persicae*, plum curculio, *Conotrachelus neuphar*, codling moth, *Carpocapsa pomonella*, and the red-banded leaf roller, *Argyrotaenia velutinana*.

Where more difficult-to-control insects are present or where spraying intervals are much longer, one or more of the following insecticides is added to the spray in effective amounts along with the compound of this invention: DDT, methoxychlor, malathion, parathion, lead arsenate, "Guthion®," carbaryl or dieldrin.

EXAMPLE 129

| | Percent |
|---|---|
| Methyl O - (methylcarbamyl) - p - chlorothiolbenzohydroxamate | 3.0 |
| Dichlorodifluoromethane | 57.0 |
| Trichlorofluoromethane | 40.0 |

The solution is formed under pressure with moderate cooling and packed into pressure vessels.

This aerosol formulation is applied in space application to a restaurant or other type of food establishment. House flies, *Musca domestica*, present at the time of application are killed.

EXAMPLE 130

| | Percent |
|---|---|
| n - Propyl O - (methylcarbamyl)thiolacetohydroxamate | 20.0 |
| Mixed polyoxyethylene sorbitol ester | 3.0 |
| Diacetone alcohol | 77.0 |

The ingredients are combined and stirred with warming to produce a homogeneous solution which can be diluted with water. This dilution is made in a manner to provide 1.5 pound of the active compound of this invention in 10 gallons of water. An emulsifiable formulation of chlordane is also added in an amount to provide 1 pound active in 10 gallons. The resulting composition is then sprayed on sugarcane seed pieces in the open furrow at the time of planting at the rate of 10 gallons per 10,000 feet of row providing control of a variety of insects.

EXAMPLE 131

| | Percent |
|---|---|
| Methyl O - (methylcarbamyl)thiolbutyrohydroxamate | 20.0 |
| Methylene chloride | 74.0 |
| Blend of oil soluble sulfonates and polyoxyethylene ethers | 6.0 |

The ingredients are combined and stirred to produce a homogeneous emulsifiable solution. This emulsifiable formulation is added to water in an amount to provide 5 pounds of active ingredient per 100 gallons. Sprayed by air on field sugarcane foliage at the rate of 20 gallons (1.0 pound active) per acre, at weekly intervals, this preparation provides control of armyworms and the sugarcane borer, *Diatraea saccharalis*. Where spray intervals are significantly longer than one week, one or more of the following insecticides is added to the spray in an effective amount: toxaphene, carbaryl, endrin or "Guthion®."

EXAMPLE 132

| | Percent |
|---|---|
| Methyl O - (methylcarbamyl)thiolacetohydroxamate | 5.0 |
| Trimethylnonyl polyethylene glycol ether | 2.0 |
| Phenylmercury acetate | 0.1 |
| Water | 92.9 |

The ingredients are stirred to produce a solution.

This composition is diluted with water to a final concentration of 0.1% active. House flies, *Musca domestica*, and certain other flies such as stable flies, *Stomoxys calcitrans*, are controlled in farm buildings, in barnyards and other outdoor locations by spraying this formulation as a space spray by mist blower or directly to the flying or resting insects by use of a hydraulic sprayer.

The formulation above, diluted to 10 pounds active ingredient per 100 gallons is also applied at a rate of 100 gallons per acre to land being renovated for pasture, in order to control ticks.

EXAMPLE 133

| | Percent |
|---|---|
| Methyl O-(methylcarbamyl)thiolacetohydroxamate | 25.0 |
| Methanol | 45.0 |
| Water | 30.0 |

The above water-soluble concentrate is prepared by blending the components in a stirred vessel until solution of the active compound is complete. This preparation is sprayed by air on areas of deciduous forest at the rate of 1.0 gallon per acre providing control of the gypsy moth, *Porthetria dispar*. Where more resistant insects are also present, one or more of the following insecticides are added in effective amounts to the spray containing the compound of this invention: methoxychlor, DDT carbaryl, malathion or toxaphene.

The above formulation is added to water in an amount to provide 0.75 pound of active insecticide per 100 gallons. The water containing the insecticide is then sprayed on field rice at 10-day intervals providing control of the Oriental rice borer, *Chilo simplex*.

Where insects such as the grape colaspis and stink bugs are present in addition to the Oriental rice borer, other insecticides such as EPN, carbaryl, "Guthion®," malathion, methyl parathion or parathion are also added to the spray.

EXAMPLE 134

| | Percent |
|---|---|
| Methyl O-(methylcarbamyl)acetohydroxamate | 45 |
| Trimethylnonyl polyethylene glycol ether | 5 |
| Cyclohexanone | 50 |

The ingredients are combined and stirred to produce a homogeneous solution which can be diluted with water and applied as an aqueous solution.

A finished spray containing 1% of this formulation applied to run-off by means of a knapsack sprayer effectively controls green peach aphids, *Myzus persicae*, infesting carnations.

EXAMPLE 135

| | Percent |
|---|---|
| Methyl O-(methylcarbamyl)-butyrohydroxamate | 20 |
| Xylene | 74 |
| Blend of oil soluble sulfonates and polyoxyethylene ethers | 6 |

The ingredients are combined and stirred to produce a homogeneous solution. This formulation is emulsified with water and applied in the manner described for the formulation of Example 131.

EXAMPLE 136

| | Percent |
|---|---|
| Methyl p - chloro - O - (methylcarbamyl)-benzohydroxamate | 75 |
| Sodium alkylnaphthalenesulfonate | 2 |
| Calcium ligninsulfonate | 2 |
| Kaolinite clay | 21 |

The ingredients are thoroughly blended and micropulverized to produce particles substantially all below 50 microns. The composition may be used as a dust base or as a wettable powder.

EXAMPLE 137

| | Percent |
|---|---|
| Methyl O-(methylcarbamyl)thiolacetohydroxamate | 5.0 |
| Granular attapulgite (6–12 meshes/cm.) | 95.0 |

The active component is warmed to 75° C. with three parts of water per part of active and the resulting warm solution is sprayed on the granules which are tumbled in a mixer. The granules are dried in a circulating air oven and are then ready for application.

The granules prepared as described above are applied to the soil during the planting of corn, in the furrow, at a rate to provide 2.0 pounds of active ingredient per acre of field. This treatment gives control of corn rootworms and other soil insects. Where more difficult-o-kill soil insect species are also present, granules containing one or more of the following insecticides are added in effective amounts: parathion, aldrin, diazinon or phorate.

EXAMPLE 138

| | Percent |
|---|---|
| Methyl O-(methylcarbamyl)thiolacetohydroxamate | 10.0 |
| Granular attapulgite (8–16 mesh/cm.) | 90.0 |

The active ingredient is dissolved in a minimum amount of methylene chloride and is then sprayed upon the attapulgite in a blender. The methylene chloride is removed by air drying.

The granules prepared as described above are applied in the planting furrows of potatoes at the rate of two pounds of active ingredient per 10,000 linear feet of row. This treatment controls white-fringed beetle grubs, *Graphognathus leucoloma*, in the soil and potato aphids, *Macrosiphum solanifolii*, on the foliage for an extended period. This foliage protection is due to the systemic movement of the compound of this invention from the soil up into the foliage. Where more difficult-to-kill insect species are also present in the soil, granules containing one or more of the following insecticides are added in effective amounts: chlordane, DDT, diazinon or parathion.

EXAMPLE 139

| | Percent |
|---|---|
| Methyl O-(methylcarbamyl)thiolacetohydroxamate | 5.0 |
| Granular attapulgite (6–12 mesh/cm.) | 95.0 |

The finely divided active component is tumbled with the granules in order to coat the surface. The entire mass is heated to 85° C. to melt the active compound which is adsorbed in and on the surface of the granules. The cooled granules are then ready for application.

The granules prepared as described above are applied to small sweet corn plants at the rate of 20 pounds per acre. The application is made in such a way that the granules roll down into the whorls of the plants. Corn earworms, *Heliothis zea*, attacking the growing area are controlled.

EXAMPLE 140

| | Percent |
|---|---|
| Methyl O - (methylcarbamyl) - p - chlorothiolbenzohydroxamate | 20.0 |
| Sodium sulfate | 10.0 |
| Mixed calcium and sodium ligninsulfonates | 13.0 |
| Mississippi sub-bentonite | 31.0 |
| Kaolinite | 26.0 |

This mixture is coarsely micropulverized and blended with about 18% by weight of water. This moist composition is extruded and cut to form pellets which are dried prior to use.

The pellets described here are used in the same manner as the granules of Example 139 except that the use rate is 5 pounds of pellets per acre. The insecticidal results of this application are the same as those obtained with the granules.

EXAMPLE 141

Equimolecular proportions of methyl O-(methylcarbamyl)-thiolacetohydroxamate and urea are dissolved in excess methanol and the methanol is allowed to evaporate at room temperature. The residue melts sharply at 96–97° C. either before or after recrystallization from methanol. Elemental analysis confirms a 1:1 molar complex of urea and methyl O-(methylcarbamyl)-thiolacetohydroxamate.

Other complexes are prepared in like manner by substituting thiourea and dicyandiamide for urea to yield crystalline solids, M.P. 112–113° C. and 113–115° C., respectively.

Methyl O-carbamyl thiolacetohydroxamate, as well as other carbamylthiolacetohydroxamates, can be substituted for methyl O - (methylcarbamyl)thiolacetohydroxamate with similar results.

EXAMPLE 142

| | Percent |
|---|---|
| Methyl O-(methylcarbamyl)thiolacetohydroxamate-1:1 complex with urea | 95.0 |
| Synthetic silica | 5.0 |

The above composition is prepared by micropulverizing the ingredients to a particle size passing a 16 mesh/cm. screen.

The 1:1 complex of methyl O-carbamylthiolacetohydroxamate with urea can be formulated in like manner.

The formulation of methyl O-carbamylthiolacetohydroxamate described above is added to water in an amount to provide 6 pounds of the 1:1 complex per 100 gallons of water. This is sprayed on cotton plants at the rate of 25 gallons (1.5 pounds of complex) per acre providing control of boll weevil, *Anthonomus grandis*, and bollworms, *Heliothis zea*. Where more difficult-to-kill insect species are also present, an insecticidal amount of one or more of the following materials is added to the spray: DDT, endrin, carbaryl, malathion, methyl parathion, parathion, "Guthion®", or toxaphene

EXAMPLE 143

| | Percent |
|---|---|
| 1,4-dichloro-2,5-dimethoxybenzene | 50.0 |
| Methyl O - (methylcarbamyl)thiolacetohydroxamate | 25.0 |
| Octylphenylpolyethylene glycol ether | 1.0 |
| Sodium alkylnaphthalenesulfonate | 0.75 |
| Sodium lignin sulfonate | 2.75 |
| Synthetic silica | 0.75 |
| Diatomaceous earth | 2.75 |
| Thiram | 10.0 |
| Magnesium carbonate | 7.0 |

The above components are blended and micropulverized to pass a 24 mesh/cm. screen. This wettable powder can be applied by spraying or in a seed treater to coat seeds.

The above formulation is applied to cotton seed in a standard seed treater at the rate of 12 ounces of formulation per 100 pounds of cotton seed along with 3 ounces of "Ceresan"L per 100 pounds of seed. Such treatment prevents seed and seedling loss due to Pythium and Rhizoctonia as well as seedling damage by aphids and certain other insects. Where other soil fungi such as Fusarium are considered to be a hazard 2-carboxyamino-1-benzimidazolecarboxylic acid, dimethyl ester, is also added to the seed at the same rate as the 1,4-dichloro-2,5-dimethoxybenzene.

EXAMPLE 144

| | Percent |
|---|---|
| Methyl O - (methylcarbamyl)thiolacetohydroxamate | 50.0 |
| Ethylmercury p-toluenesulfonanilide | 2.0 |
| Thiram | 25.0 |
| Synthetic silica | 3.0 |
| Attapulgite clay | 20.0 |

The above components are blended and micropulverized to a particle size essentially below 50 microns. This wettable powder can be suspended in water and used to treat seeds or with appropriate dilution, as a spray.

The above formulation is added to cotton seed in a standard slurry seed treater at the rate of 16 ounces of formulation per 100 pounds of seed. This treatment protects the seed from attack by soil fungi, and insects. It also protects the seedling from attack by cotton aphids, *Aphis gossypii*, for an extended period by systemic movement of the methyl O-(methylcarbamyl)thioacetohydroxamate from the area of the seed up into the seedling.

EXAMPLE 145

| | Percent |
|---|---|
| Methyl O - (methylcarbamyl)thiolacetohydroxamate | 10.0 |
| Ethylmercury p-toluenesulfonanilide | 7.0 |
| Thiram | 25.0 |
| Synthetic silica | 3.0 |
| Attapulgite clay | 55.0 |

The above components are blended and micropulverized to a particle size essentially below 50 microns. This wettable powder can be suspended in water and used to treat seeds or, with appropriate dilution, as a spray.

The formulation above is added to cotton seed in a standard slurry seed treater at the rate of 10 ounces of formulation per 100 pounds of seed. This treatment protects the seed from attack by soil fungi, and insects, and results in a fine stand of cotton seedlings.

EXAMPLE 146

| | Percent |
|---|---|
| Methyl O - (methylcarbamyl)thiolacetohydroxamate | 50.0 |
| Ethylmercury p-toluenesulfonanilide | 0.1 |
| Thiram | 25.0 |
| Synthetic silica | 3.0 |
| Attapulgite clay | 21.9 |

The above components are blended and micropulverized to a particle size essentially below 50 microns. This wettable powder can be suspended in water and used to treat seeds or, with appropriate dilution, as a spray.

The above formulation is added to cotton seed in a standard slurry seed treater at the rate of 15 ounces of formulation per 100 pounds of seed. This treatment protects the seed from attack by soil fungi and insects. It also protects the seedling from attack by cotton aphids, *Aphis gossypii*, for an extended period by systemic movement of the methyl O - (methylcarbamyl)thiolacetohydroxamate from the area of the seed up into the seedling.

EXAMPLE 147

| | Percent |
|---|---|
| Methyl O - (methylcarbamyl)thiolacetohydroxamate | 50.0 |
| 2-carboxyamino-1-benzimidazolecarboxylic acid, dimethyl ester | 25.0 |
| Kaolinite clay | 20.0 |
| Sodium dihydrogen phosphate | 1.0 |
| Sodium alkylnaphthalene sulfonate | 2.0 |
| Calcium lignin sulfonate | 2.0 |

The above components are blended and micropulverized to a particle size essentially below 25 microns. This wettable powder is suitable for use in spraying fruit trees and vegetable crops.

This formulation is added to water at the rate of 1.0 pound of formulation per 100 gallons of water. When the resulting preparation is sprayed on apple trees on a regular schedule at the rate of 300 gallons per acre, the trees are protected from attack by insects such as aphids, codling moth, *Carpocapsa pomonella*, and plum curculio, *Conotrachelus nenuphar*, as well as from diseases including apple scab and powdery mildew.

EXAMPLE 148

| | Percent |
|---|---|
| Methyl O-(methylcarbamyl)thiolacetohydroxamate | 40.0 |
| Streptomycin sulfate | 1.0 |
| Maneb | 40.0 |
| Methylate cellulose | 2.0 |
| Sodium alkylnaphthalene sulfonate | 1.0 |
| Kaolinite | 16.0 |

The above ingredients are blended and micronized to a particle size passing a screen having 0.25 millimeter square openings. This wettable powder when suspended in water is suitable for spraying vegetable crops.

The formulation described above is added to water at the rate of 3.0 pounds per 100 gallons. When this liquid is sprayed on tomato plants on a weekly schedule, the plants are protected from attack by insects and such diseases as bacterial spot and late blight.

EXAMPLE 149

| | Percent |
|---|---|
| 1,4-dichloro-2,5-dimethoxybenzene | 20.0 |
| Methyl O-(methylcarbamyl)thiolacetohydroxamate | 10.0 |
| Trimethylnonyl polyethylene glycol ether | 5.0 |
| Methylene chloride | 65.0 |

The above emulsifiable composition is prepared by blending the ingredients until a homogeneous solution is obtained. This formulation can be used as such or it can be used to prepare a granular composition by spraying on preformed 6–12 mesh/cm. granules followed by drying to remove the methylene chloride. The granules are applied in the furrow at a rate of 3 pounds total active ingredients per 10,000 linear feet of row while planting beans. This gives good control of soil fungi, particularly Rhizoctonia, spp., and protects the seedling bean plants from aphids.

EXAMPLE 150

| | Percent |
|---|---|
| Methyl O - (methylcarbamyl)thiolacetohydroxamate | 20.0 |
| Methylmercury 2,3-dihydroxypropyl mercaptide | 0.5 |
| Methylmercury acetate | 0.1 |
| Methanol | 50.0 |
| Water | 29.4 |

The above solution is prepared by mixing the components. It can be used directly for seed treatment and also can be diluted with water and sprayed. When this formulation is applied to cotton seed at the rate of 30 ounces per 100 pounds, the seed is protected from fungus decay in the soil and the seedlings that develop resist attack by aphids and other insects due to the systemic movement of the compound of this invention.

EXAMPLE 151

| | Percent |
|---|---|
| Methyl O-(methylcarbamyl)thiolacetohydroxamate | 23.0 |
| EPN | 23.0 |
| Dimethyl formamide | 49.0 |
| Blend of polyoxyethylene ethers of oil-soluble sulfonate | 5.0 |

The above components are mixed to form a homogeneous solution which forms a sprayable suspension when added to water. Methyl O-carbamylthiolacetohydroxamate can be formulated and applied in like manner. The above formulation is added to water at the rate of 2.0 pounds per 100 gallons. When the resulting suspension is sprayed on potato plants at the rate of 100 gallons per acre on a regular weekly schedule, the plants are protected from attack by a wide variety of insects.

EXAMPLE 152

|  | Percent |
|---|---|
| Methyl O-carbamylthiolacetohydroxamate | 15.0 |
| DDT | 30.0 |
| Dimethyl formamide | 50.0 |
| Blend of polyoxyethylene ethers of oil-soluble sulfonates | 5.0 |

The above components are mixed to form a homogeneous solution which when added to water forms a sprayable suspension.

When this formulation is diluted with water and sprayed on corn plants at the rate of 2.0 pounds of formulation per acre, the corn plants are protected from attack by a wide variety of foliage insects.

Methyl O-(methylcarbamyl)thiolacetohydroxamate can be formulated and used in like manner.

EXAMPLE 153

|  | Percent |
|---|---|
| Methyl O-carbamylthiolacetohydroxamate | 10.0 |
| Toxaphene | 40.0 |
| Dimethyl formamide | 45.0 |
| Blend of polyoxyethylene ethers of oil-soluble sulfonates | 5.0 |

The above components are mixed and warmed to form a homogeneous solution which forms a sprayable suspension when added to water.

"Strobane ®" can be substituted for toxaphene and dimethylacetamide for dimethyl formamide with similar results. These formulations are useful in protecting a wide variety of plants from a number of damaging insects.

EXAMPLE 154

Formulations of both methyl O-(methylcarbamyl)-thiolacetohydroxamate and methyl O-carbamylthiolacetohydroxamate are prepared as described in Example 123. Two pounds of each formulation is added to a 100 gallon tank of water. This dilution is then sprayed on cotton plants at the rate of 25 gallons per acre (providing about 0.12 pound of each of the two active compounds of this invention). Excellent control of a wide variety of insect pests is obtained.

EXAMPLE 155

|  | Percent |
|---|---|
| Methyl O-carbamylthiolacetohydroxamate | 95.0 |
| Synthetic silica | 5.0 |

The above high-strength composition is prepared by coarse grinding and screening through a screen having 0.42 millimeter square openings.

This composition is stirred into water in an amount to provide 0.05 pound of the active ingredient per 100 gallons. The resulting solution is applied as a wetting spray to cabbage plants on which cabbage loopers, *Trichoplusia ni*, are feeding. Good control of the cabbage loopers is obtained.

EXAMPLE 156

Methyl O-(methylcarbamyl)-p-nitrothiolbenzohydroxamate is incorporated in a synthetic laboratory diet for boll weevils at a rate of 0.0002 percent by weight (2 parts per million). Weevils feeding on this diet lay eggs but none of these eggs hatch. Similar weevils feeding on the same diet without the methyl O-(methylcarbamyl)-p-nitrothiolbenzohydroxamate lay eggs that hatch to produce normal living young.

EXAMPLE 157

|  | Percent |
|---|---|
| Methyl N-methylthiolcarbamate | 60 |
| Methyl O-(methylcarbamyl)thiolacetohydroxamate | 12 |
| Blend of alkylarylpolyether alcohols with organic sulfonates | 8 |
| Alkylnaphthalenes (principally α - methylnaphthalene) | 20 |

These ingredients are combined with simple mixing to form a homogeneous liquid.

This emulsifiable liquid is dispersed in water at a rate that provides 36 pounds of the active ingredients per 100 gallons of water. The resulting dilute emulsion is sprayed over the root zone of rose bushes at a rate of 100 gallons per acre. The area is then irrigated with a quantity of water sufficient to carry the active ingredient into the root zone of the rose bushes. Excellent control is obtained of dagger nematodes, Xiphinema species, allowing the treated bushes to grow in a normal manner. In addition, the bushes are protected from aphids and other insects. Similarly infested rose bushes which are not treated grow poorly and produce flowers having little ornamental value.

EXAMPLE 158

|  | Percent |
|---|---|
| Methyl O-(methylcarbamyl)thiolacetohydroxamate | 26.0 |
| o-Cresol | 17.4 |
| Xylene | 52.0 |
| Sodium dodecylbenzene sulfonate | 4.6 |

The above ingredients are stirred with warming until a homogeneous solution is obtained. The resulting emulsifiable concentrate is added to water in an amount to give 65 grams of active ingredient per 100 liters of spray. This emulsion is sprayed on apple trees to the point of run-off by means of a high pressure hydraulic sprayer. Sprays on a weekly schedule provide control of green apple aphid, *Aphis pomi*, codling moth, *Carpocapsa pomonella*, plum curculio, *Conotrachelus nenuphar*, and red-banded leaf roller, *Argyrotaenia velutinana*. One or more of the following insecticides in effective amounts can be added to the spray when a longer interval between applications is desired or it is needed to control other especially difficult-to-control pests: methoxychlor, malathion or carbaryl.

The invention claimed is:
1. A compound of the formula:

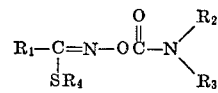

where
$R_1$ is carboalkoxyalkyl of 3 through 6 carbon atoms or carboalkoxy of 2 through 6 carbon atoms;
$R_2$ is hydrogen or methyl;
$R_3$ is hydrogen or methyl; and
$R_4$ is alkyl of 1 through 6 carbon atoms.

2. A compound of the formula:

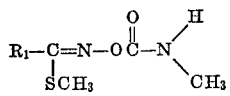

where
R₁ is carboalkoxyalkyl of 3 through 6 carbon atoms or carboalkoxy of 2 through 6 carbon atoms.

3. Methyl O-(methylcarbamyl)carboethoxythiolformohydroxamate.

4. Methyl O-(methylcarbamyl)carbomethoxythiolacetohydroxamate.

References Cited
UNITED STATES PATENTS
3,217,037  11/1965  Payne ............... 260—566

LORRAINE A. WEINBERGER, Primary Examiner
E. J. GLEIMAN, Assistant Examiner

U.S. Cl. X.R.
260—566 AC, 424—311